(12) United States Patent
Blaser

(10) Patent No.: US 9,490,668 B2
(45) Date of Patent: Nov. 8, 2016

(54) PUMP UNIT

(75) Inventor: Georg Blaser, Asperg (DE)

(73) Assignee: Grundfos Holding a/s, Bjerringbro (DK)

( * ) Notice: Subject to any disclaimer, the term of this patent is extended or adjusted under 35 U.S.C. 154(b) by 758 days.

(21) Appl. No.: 13/883,892

(22) PCT Filed: Nov. 2, 2011

(86) PCT No.: PCT/EP2011/069261
§ 371 (c)(1),
(2), (4) Date: Aug. 2, 2013

(87) PCT Pub. No.: WO2012/062637
PCT Pub. Date: May 18, 2012

(65) Prior Publication Data
US 2013/0315752 A1 Nov. 28, 2013

(30) Foreign Application Priority Data

Nov. 11, 2010 (DE) .......................... 10 2010 051 916
Nov. 11, 2010 (DE) .......................... 10 2010 051 918
Mar. 15, 2011 (EP) ..................................... 11002128

(51) Int. Cl.
*F04B 49/06* (2006.01)
*H02K 1/14* (2006.01)
(Continued)

(52) U.S. Cl.
CPC ............... *H02K 1/146* (2013.01); *F04B 49/06* (2013.01); *F04D 13/06* (2013.01); *F04D 13/064* (2013.01); *F04D 15/0218* (2013.01); *F04D 29/0467* (2013.01); *G05D 9/12* (2013.01); *H02K 1/148* (2013.01); *H02K 1/2753* (2013.01); *H02K 3/28* (2013.01); *H02K 5/128* (2013.01); *H02K 5/22* (2013.01); *H02K 9/197* (2013.01); *H02K 11/33* (2016.01); *H02K 21/16* (2013.01);
(Continued)

(58) Field of Classification Search
CPC ....................................................... H02P 6/001
USPC ................................. 318/400.3, 400.01, 700
See application file for complete search history.

(56) References Cited

U.S. PATENT DOCUMENTS 2,811,107 A  10/1957  Brill
3,814,963 A  6/1974  Laing
(Continued)

FOREIGN PATENT DOCUMENTS

CN  101646872 A  2/2010
DE  2242653 A1  3/1973
(Continued)

OTHER PUBLICATIONS

Int'l Search Report and Written Opinion issued Mar. 5, 2013 in Int'l Application No. PCT/EP2011/069261.
(Continued)

*Primary Examiner* — David S Luo
(74) *Attorney, Agent, or Firm* — Panitch Schwarze Belisario & Nadel LLP

(57) ABSTRACT

A pumping set includes an electrical drive motor and electronic controller, wherein the controller is divided into two functional modules arranged on at least two separate circuit boards, of which a first functional module represents a supply part, which provides the input voltage for the second functional module, and wherein the second functional module exhibits engine electronics that are connected with stator coils of the drive motor to supply the latter with current.

19 Claims, 3 Drawing Sheets

(51) Int. Cl.
*F04D 15/02* (2006.01)
*F04D 29/046* (2006.01)
*H02K 21/16* (2006.01)
*H02K 21/24* (2006.01)
*F04D 13/06* (2006.01)
*G05D 9/12* (2006.01)
*H02P 6/18* (2016.01)
*H02K 1/27* (2006.01)
*H02K 3/28* (2006.01)
*H02K 9/197* (2006.01)
*H02K 1/18* (2006.01)
*H02K 5/10* (2006.01)
*H02K 5/128* (2006.01)
*H02K 5/173* (2006.01)
*H02K 5/22* (2006.01)
*H02K 5/24* (2006.01)

(52) U.S. Cl.
CPC .............. *H02K 21/24* (2013.01); *H02P 6/182* (2013.01); *H02K 1/182* (2013.01); *H02K 5/10* (2013.01); *H02K 5/1282* (2013.01); *H02K 5/1737* (2013.01); *H02K 5/225* (2013.01); *H02K 5/24* (2013.01)

(56) References Cited

U.S. PATENT DOCUMENTS

| | | | |
|---|---|---|---|
| 4,043,706 A | | 8/1977 | Walker |
| 4,051,401 A | | 9/1977 | Hayward |
| 4,352,646 A | | 10/1982 | Laing et al. |
| 4,471,253 A | | 9/1984 | Laing |
| 5,552,653 A | | 9/1996 | Nose |
| 6,023,137 A | * | 2/2000 | Kumar .................. B60L 11/123 123/352 |
| 6,295,879 B1 | * | 10/2001 | Miller ..................... B62D 6/10 180/444 |
| 7,015,603 B2 | | 3/2006 | Barrho et al. |
| 7,855,486 B2 | | 12/2010 | Hasegawa |
| 8,264,186 B2 | * | 9/2012 | Hanai ................. F02D 41/3082 318/244 |
| 2002/0098089 A1 | | 7/2002 | Forsberg |
| 2005/0225192 A1 | | 10/2005 | Kloepzig et al. |
| 2008/0007126 A1 | | 1/2008 | Popov et al. |
| 2010/0090635 A1 | | 4/2010 | Andersen et al. |
| 2010/0111729 A1 | | 5/2010 | Andersen et al. |
| 2011/0241454 A1 | | 10/2011 | Staehr |

FOREIGN PATENT DOCUMENTS

| | | |
|---|---|---|
| DE | 2262867 A1 | 7/1974 |
| DE | 3436510 A1 | 4/1986 |
| DE | 4225148 A1 | 2/1994 |
| DE | 196107083 A1 | 10/1997 |
| DE | 19646617 A1 | 5/1998 |
| DE | 102004017507 A1 | 10/2005 |
| DE | 102004027744 A1 | 12/2005 |
| DE | 102006026719 A1 | 12/2007 |
| DE | 102007042186 A1 | 3/2009 |
| DE | 202007018771 U1 | 3/2009 |
| DE | 102009048889 A1 | 5/2010 |
| EP | 0688088 A1 | 12/1995 |
| EP | 1063751 A1 | 12/2000 |
| EP | 1203886 A2 | 5/2002 |
| EP | 1947343 A1 | 7/2008 |
| EP | 1947753 A1 | 7/2008 |
| EP | 2040350 A2 | 3/2009 |
| JP | 2003-018797 A | 1/2003 |
| WO | 9305564 A1 | 3/1993 |
| WO | 9835424 A1 | 8/1998 |
| WO | 03103114 A1 | 12/2003 |
| WO | 2008019818 A1 | 2/2008 |
| WO | 2008135103 A1 | 11/2008 |
| WO | 2008150334 A1 | 12/2008 |
| WO | 2009006927 A1 | 1/2009 |
| WO | 2009012883 A2 | 1/2009 |
| WO | 2010031468 A1 | 3/2010 |

OTHER PUBLICATIONS

Int'l Search Report and Written Opinion issued Feb. 20, 2013 in Int'l Application No. PCT/EP2011/069260.
Int'l Search Report and Written Opinion issued Mar. 8, 2013 in Int'l Application No. PCT/EP2011/069340.
Int'l Search Report issued Mar. 15, 2013 in Int'l Application No. PCT/EP2011/069264.
Int'l Search Report issued Mar. 1, 2013 in Int'l Application No. PCT/EP2011/069262.
Office Action issued Apr. 1, 2011 in DE Application No. 10 2010 051 916.2.
Office Action issued Nov. 28, 2011 in DE Application No. 10 2010 051 918.9.
English translation of an Office Action issued Feb. 4, 2015 in CN Application No. 201180064800.4.

* cited by examiner

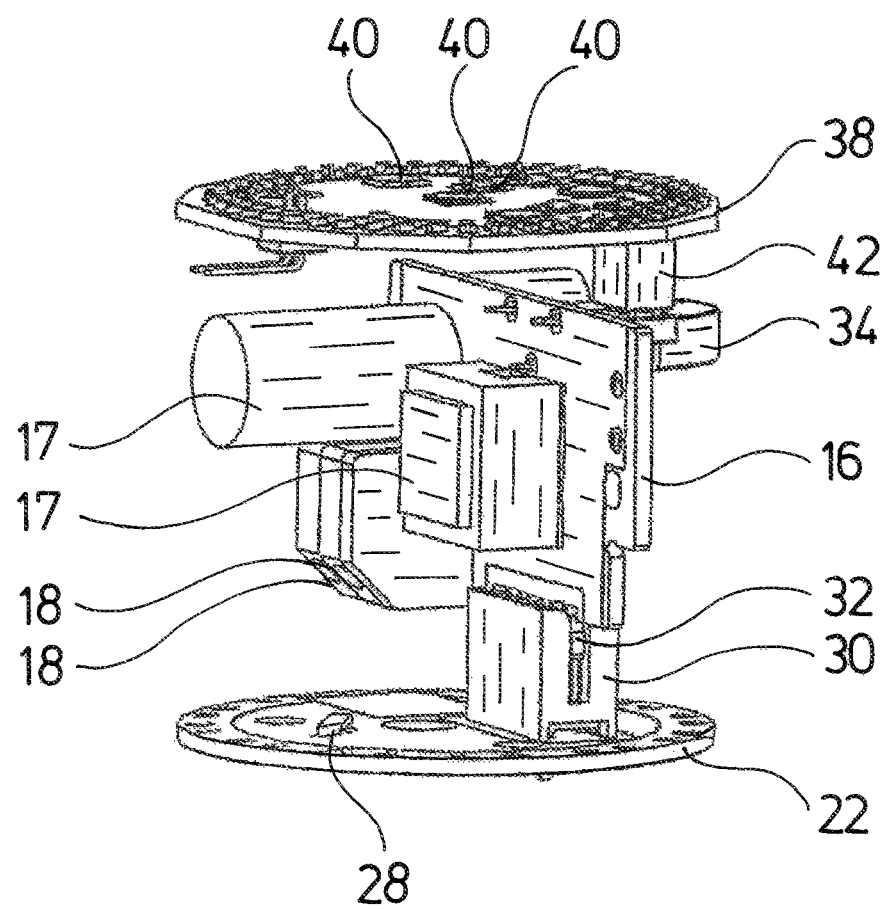

PUMP UNIT

CROSS-REFERENCE TO RELATED APPLICATIONS

This application is a Section 371 of International Application No. PCT/EP2011/069261, filed Nov. 2, 2011, which was published in the German language on May 18, 2012, under International Publication No. WO 2012/062637 A2 and the disclosure of which is incorporated herein by reference.

BACKGROUND OF THE INVENTION

Embodiments of the invention relate to a pumping set with an electric drive motor and an electronic controller.

For example, such pumping sets are known as recirculation pumping sets, in particular heating or industrial water pumping sets. These pumping sets exhibit an electric drive motor, which drives one or more impellers in a pump housing. Known for controlling the drive motor are electronic controllers, in particular frequency inverters, which make it possible to control the speed of the drive motor.

In the known pumping sets, it is common for the drive motor to be arranged in a stator casing, and the electronic components for controlling the drive motor to be arranged in an electronics housing, which is attached to the motor housing or stator casing from outside. The electronics housing can here be circumferentially or also axially secured to the stator casing. Such pumping sets are frequently offered in a variety of configurations, which each exhibit various controllers, whether it be that they must be tailored to various input voltages for different countries, or that various functions must be provided for controlling the drive motor.

It is desirable to improve a pumping set in the electric drive motor and an electronic controller in such a way that the controller can be easily tailored to various intended applications.

BRIEF SUMMARY OF THE INVENTION

In addition to the actual pump, i.e., a pump housing and at least one impeller, the pumping set according to embodiments of the invention exhibits a drive motor that drives the impeller, as well as an electronic controller for controlling the drive motor. Embodiments of the invention here provide that the controller not be integrated into an assembly, but rather exhibit at least two separate functional modules. These functional modules are here formed on at least two separate circuit boards or cards. Of these functional modules, a first functional module represents a supply part that provides the input voltage for the second functional module. In other words, the first functional module is used to supply current or voltage to the second functional module. The second functional module has engine electronics that are connected with stator coils of the drive motor to supply the latter with current. In other words, the second functional module in conjunction with the engine electronics handles the actual control operations relating to the drive motor, for example electronic commutation.

Dividing the controller into these at least two functional modules enables a simple adjustment to various intended applications. For example, if the control electronics are to be adjusted to a different power supply voltage, all that need be done is to replace the first functional module used to supply current or voltage to the second functional module with another one. The second functional module with the engine electronics can remain unchanged. The first functional module could further also be omitted in cases where an external utility is present that already provides the required input voltage for the second functional module. As evident, then, dividing the controller into at least two functional modules as described in embodiments of the invention allows for a more flexible use of the control electronics.

The supply part of the first functional module preferably provides an extra-low voltage as the input voltage for the second functional unit. It is especially preferred that this be a voltage of 12 or 24 V. A direct current voltage is ideally involved here. In other words, the supply part in this embodiment constitutes a power supply unit, which converts a connection voltage into a desired input voltage for the second functional module. Various first functional modules can then be provided for the different connection voltages, for example also an extra-low voltage or a 110 V alternating current or 240 V alternating current, for example, which are easy to change out and provide identical input voltages for the second functional module. In a case where an external utility is present to provide the desired extra-low voltage, the first functional module can potentially be done away with entirely, and the second functional module can be directly connected to the external utility, for example the voltage supply for a boiler controller in a heating system.

It is further preferred that the engine electronics also be designed to supply the stator coils with extra-low voltage. A voltage of 12 or 24 V is here preferably also involved. The advantage to using extra-low voltage for operating the drive motor, i.e., for supplying current to the stator coils, is that the stator coils can be designed with fewer coils and thicker winding wires. This simplifies the winding process, since fewer windings must be formed, and a thicker winding wire is easier to handle. The insulation is simplified as well, since the requirements placed on insulation for wires carrying an extra-low voltage are different from those for wires carrying a low voltage, for example if the coils are supplied with low voltage.

The first and second functional modules are preferably connected to each other by an electrical plug-in connector. This enables a simple assembly, as well as a potentially simple exchange of individual functional modules, since the plug-in connector can be easily detached and then reinserted.

The first functional module preferably contains a transformer or switching power supply, which reduces a connection voltage, for example a supply voltage of 240 or 400 V, to a desired input voltage for the second functional module, for example 12 or 24 V. At the same time, the supply part of the first functional module can also contain a rectifier, which rectifies a connection voltage in the form of an AC voltage, so that a DC voltage is output as the input voltage for the second functional module.

According to another preferred embodiment, the first functional module exhibits at least one setting element, in particular for setting a speed for the drive motor, and/or a sensor element, which are signal-connected with the second functional module. In this embodiment, the first functional module thus contains not just the actual supply part, but also sensor or setting elements whose output signals are to be relayed to the second functional module containing the actual control electronics or engine electronics. For example, the first functional module can have a potentiometer, which is used to set the speed for the motor. This potentiometer is electrically connected with the engine electronics on the second functional module, which then sets the speed accordingly. In this way, the set speed value can be relayed to the engine electronics as a voltage signal. The first functional module could also exhibit sensors, for example a temperature sensor, whose output signal is relayed to the engine electronics in the second functional module, for example to turn off the motor if a specific temperature in the first functional module has been exceeded. Additional setting, operating and/or display elements could also be arranged on the first functional module, and signal-connected with the engine electronics in the second functional module electrically or in some other suitable way. For example, this is advantageous if the first functional module is situated in such a way as to be poorly accessible from the outside, making it unsuitable for directly attaching operating or display elements directly to the second functional module. The first functional module could then be arranged so as to be more readily accessible, so that it makes sense to accommodate operating and/or display elements on the latter. A signal connection could be established electrically or, for example, even wirelessly by radio. As already described above, the engine electronics of the second functional module are preferably designed to control the speed of the drive motor, and preferably exhibit at least one electronic circuit breaker for generating an output voltage of the desired frequency. If the first functional module provides the engine electronics preferably with a DC voltage as the input voltage, the engine electronics supply current to the stator coils via one or more circuit breakers with the frequency required to achieve a desired motor speed.

The engine electronics preferably exhibit at least part of a frequency inverter, in particular the output circuit of a frequency inverter; the input circuit is then preferably formed by the supply part, i.e., the first functional module.

In an especially preferred embodiment of the invention, the second functional module is arranged in a stator casing of the drive motor, and the first functional module is arranged in an electronics housing connected with the stator casing. This makes it possible to position the actual engine electronics directly in the drive motor, i.e., in the stator casing near the stator coils. In this way, the stator casing can incorporate a circuit board, which contacts the individual stator coils and wires them together, and additionally carries the electronic components of the second functional module, in particular the engine electronics. This enables a simple electrical wiring and assembly, since the engine electronics and coils can be electrically contacted via the same exact circuit board. Furthermore, a compact design can be realized for the drive motor, and the engine electronics along with the stator can be tightly sealed in the stator casing.

By contrast, the first functional module including the supply part is best accommodated in an electronics housing located outside the stator casing. The advantage to this is that said electronics housing can be designed in such a way as to be easily opened, for example to link a connection line with the electrical components of the first functional module. For example, a terminal clamp or terminal plug can be provided in the electronics housing for linking with a connection line. The operating or display elements and sensor connections described above are also easy to accommodate on the electronics housing, since such an electronics housing arranged on the stator casing is readily accessible from outside. In addition, the first functional module arranged in the electronics housing or the entire electronics housing can be easily changed out, so as to implement desired adjustments of the kind described above, for example provide varying first functional modules for different connection voltages. This is advantageous from a manufacturing standpoint, since the stator casing with engine electronics incorporated therein can then be identically configured for all pump variants, and only various electronics housings with different first functional modules must be connected with these stator casings. This reduces the variety of parts used in production.

The interior of the stator casing and interior of the electronics housing are preferably separated from each other by at least one wall. In this way, the electronic components can be protected inside the stator casing and/or inside the electronics housing, in particular against penetrating moisture. In order to electrically connect the electronic components or functional modules in the stator casing and electronics housing, an opening is preferably provided in the at least one wall for a cable bushing or electrical plug contacts. As an alternative, electrical plug contacts could also be formed directly in the wall, for example by casting electrical conductors into the wall made out of plastic.

In a particular embodiment of the invention, the electronics housing is secured to an axial face of the stator casing. For example, such a stator casing is tubular in design, wherein one axial end of the stator casing is attached to a pump housing, while the electronics housing is attached to the opposing axial end. In this way, the electronics housing can simultaneously seal the adjacent axial face of the stator casing. In addition, the stator casing can be sealed in this region by a cover, so that the stator casing remains sealed even when the electronics housing is removed. The cover then forms a wall between the stator casing and electronics housing.

It is especially preferred that the second functional module form a modular unit with the stator of the drive motor. In this way, the second functional module can exhibit a circuit board with electronic components that is directly secured to the stator, so that it can establish the electrical connection to the individual stator coils as described above. On the one hand, this yields a compact structural design for the stator, and hence the entire drive motor. On the other hand, it simplifies assembly, since the stator is prefabricated as a single modular unit with the second functional module, after which this modular unit can be completely inserted into the stator casing.

In another preferred embodiment of the invention, the circuit boards of the first functional module and second functional module extend at an angle relative to each other, and preferably normal relative to each other. This arrangement enables the realization of a simple connection between the two circuit boards, since one of the circuit boards, preferably the circuit board of the second functional module, can be provided with an electrical plug-in coupling, which engages a lateral edge of the other circuit board, preferably the circuit board of the first functional module, wherein electrical contacts are formed adjacent to this lateral edge on the circuit board. As a result, the circuit board can itself form a plug that engages with the plug-in coupling in an electrically conductive manner.

In a special embodiment of the invention, the controller can encompass a third functional module, which exhibits operating and/or display elements. In this type of third functional module, such operating and/or display elements can be combined. This is advantageous, since this third functional module can then be placed in such a way as to be readily accessible from outside when performing operations or taking readings. For example, the third functional module can be arranged on the surface, e.g., in the cover of an electronics housing. In addition, this third functional module can again be made available in a range of variants, so that varying functionalities can be provided for the pumping set. As a result, one and the same pumping set can be offered with various possible settings. In such a case, the pumping sets can be identically configured except for the third functional module, which reduces the variety of parts used in production. It is further also conceivable to offer a pumping set with or without third functional modules, for example when no setting options are even desired at all, since the pump is actuated from an external controller or intended to run constantly.

The third functional module is preferably electrically connected with the first functional module. A plug-in connector is preferably provided here too, which enables a simple assembly. Here as well, the circuit board of the first functional module and a circuit board of the third functional module can preferably be situated at an angle, in particular normal, relative to each other. For example, the circuit board of the first functional module can also have a lateral edge provided with contacts that engages into a plug-in coupling, which is formed on a circuit board of the third functional module.

The third functional module can be linked with the first functional module, wherein the first functional module preferably establishes a signal connection between the third and second functional module. In this way, display and/or actuating or setting elements or control elements can be provided on the third functional module, which influence the engine electronics in the second functional module, or display specific settings or operating states of the engine electronics in the second functional module. In other words, the third functional module does not interact directly with the first functional module in this case, but rather with the second functional module. However, the first functional module here does establish the necessary signal connection between the second and third functional module, for example by correspondingly providing conductor paths on a circuit board of the first functional module.

It is especially preferred that the pumping set be a recirculation pumping set, in particular a heating or industrial water recirculation pumping set. The drive motor can here preferably be a canned motor or spherical motor, i.e., a wet-running electric motor, in which a can is arranged between the stator and rotor, so that the rotor turns in the liquid to be conveyed. Such a can is also to be understood as a separating calotte of the kind used in a spherical motor. In terms of the invention, a can may thus be construed as any suitable separating element for dividing the rotor chamber and stator chamber, regardless of its shape.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is an individual view of the electronic components in a pumping set according to an embodiment of the invention.

DETAILED DESCRIPTION OF THE INVENTION

Figure 1:
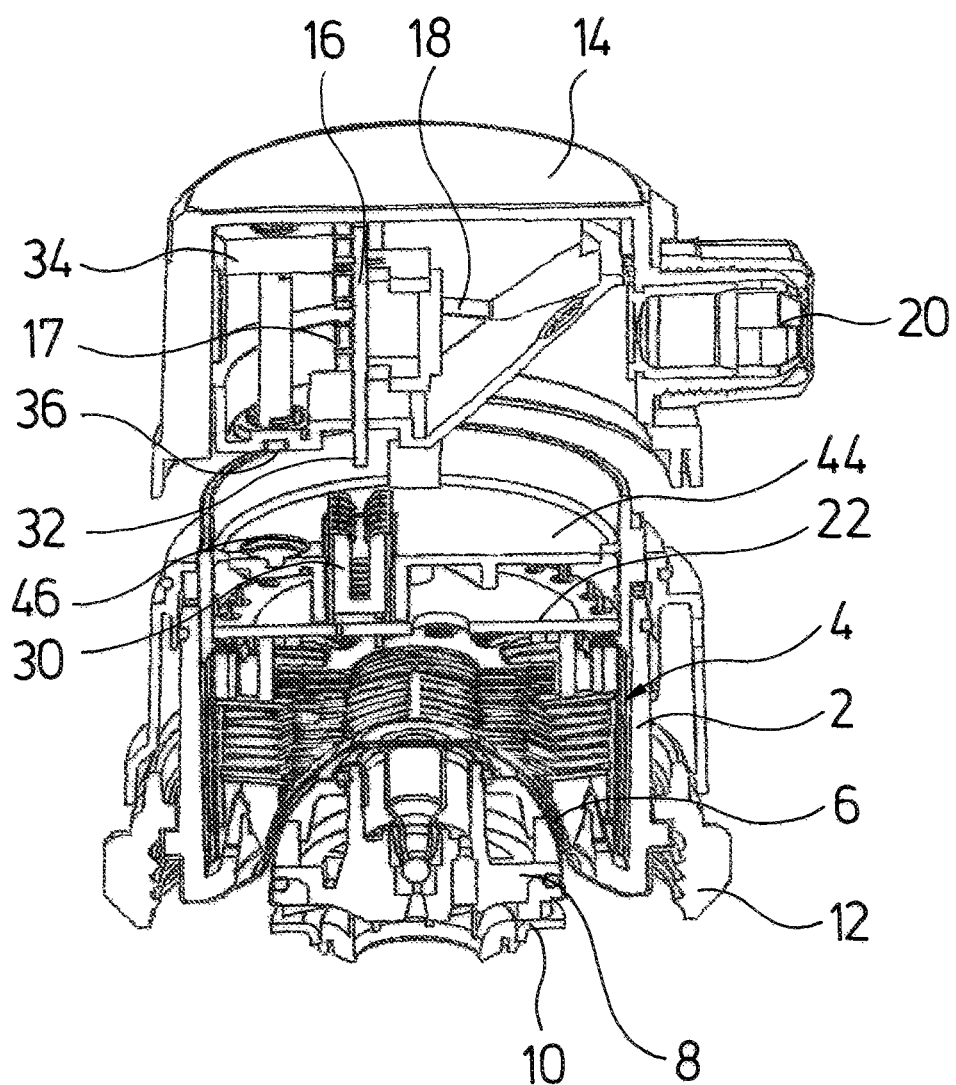
FIG. 1 is a partially exploded side view of a pumping set according to an embodiment of the invention.
Figure 2:
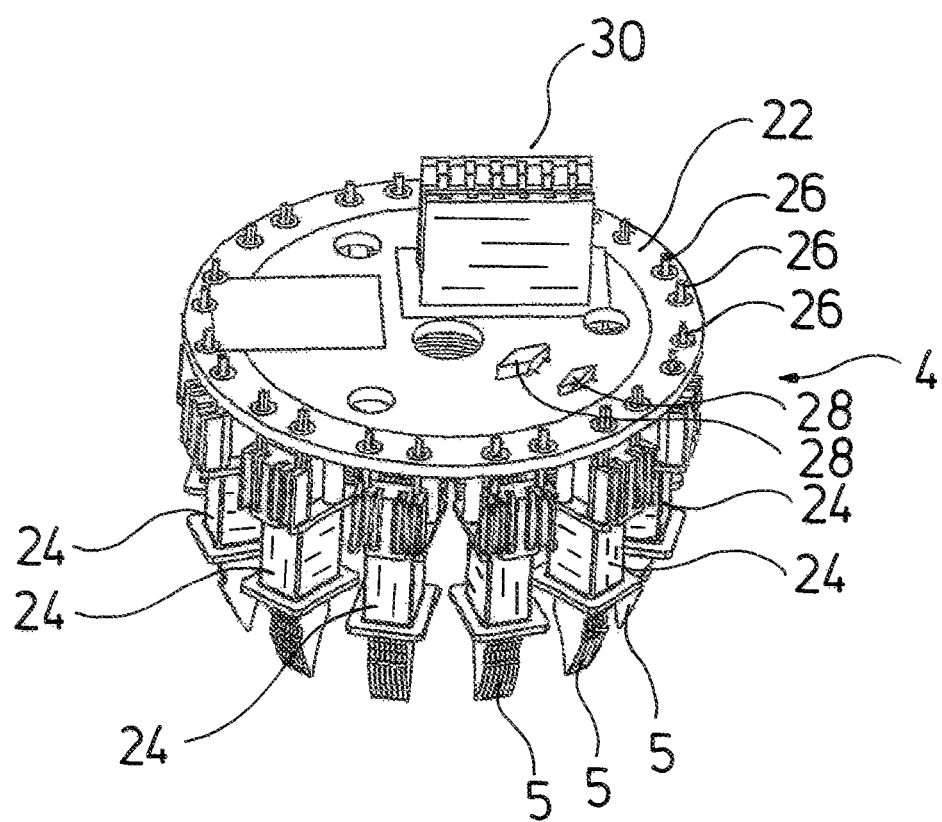
FIG. 2 is a detailed view of the stator of the pumping set according to FIG. 1.

The pumping set according to an embodiment of the invention exhibits a motor housing or stator casing 2, inside of which a stator 4 is arranged, along with a can 6 in the form of a separating calotte, inside of which a rotor 8 is arranged. The end of the rotor 8 facing away from the stator 4 carries an integrated impeller 10, which runs in a pumping set not depicted here. The pumping set is connected with the stator casing 2 by means of a retainer nut 12 that acts on the stator casing 2.

The stator casing 2 is essentially tubular in design, and sealed at its own axial end by the separating calotte or can 6. An electronics housing 14 is secured to the stator casing 2 at the opposing axial end. The electronics housing 14 is pot shaped in design, and attached at its open side to the stator casing 2, so that the stator casing 2 seals this open side.

The electronic controller of this pumping set is divided into several functional modules. A first functional module is arranged inside the electronics housing 14. This first functional module is formed by a circuit board 16. The circuit board 16 carries electronic components 17, which represent a supply part, in particular a power supply unit. This power supply unit is connected by way of terminal clamps 18 with a power cable not depicted here, which is routed through the cable bushing 20 into the electronics housing 14. The supply part formed by the circuit board 18 provides an input voltage, in particular an extra-low voltage, for example a 12 V direct current, as the input voltage for a second functional module. This second functional module is formed by a circuit board 22, which comprises a single modular unit with the stator 4, and is arranged in the stator casing 2. The circuit board 22 contacts the stator coils 24, which have terminal pins 26 that engage into holes of the circuit board 22. The circuit board 22 additionally carries electronic components 28, which constitute the actual engine electronics or motor controller. These electronic components 28 serve to supply a controlled current to the coils 24, which are correspondingly wired and connected with the electronic components 28 on the circuit board 22. As part of a frequency inverter, the electronic components 28 serve in particular to supply the coils 24 with a voltage having the desired frequency. Preferably situated on the circuit board 22 for this purpose is at least one circuit breaker, which represents one of the components 28.

This second functional module formed by the circuit board 22 exhibits a plug-in coupling 30 into which an edge 32 of the circuit board 16 engages. The edge 32 of the circuit board exhibits electrical contacts on at least one surface, which engage the electrical contacts of the plug-in coupling 30 in an electrically conductive way. In the manner described above, an input voltage is supplied via this plug-in coupling 30 to the second functional module, which is formed by the components 28 on the circuit board 22 and the accompanying electronic components 28. In addition, control signals can also be transmitted to the engine electronics in the second functional module.

The circuit board 16 has arranged on it a potentiometer 34, which can be turned by way of an adjusting screw 36. The potentiometer 34 serves to set the speed of the drive motor. In the first functional module formed by the circuit board 16 and accompanying electronic components 17, the potentiometer 34 is used to generate a voltage signal that is proportional to the desired speed of the motor. This voltage is transmitted via the plug-in connector formed by the plug-in coupling 30 to the second functional module formed by the circuit board 22 and electronic components 28 arranged thereon, so that the engine electronics formed by the electronic components 28 then supply current to the coils 24 with a desired frequency, and thereby set the speed. In other words, the engine electronics on the circuit board 22 in this case control the speed of the drive motor as a function of a voltage signal it receives from the first functional module.

The embodiment according to FIG. 3 provides yet a third functional module, which is formed by a third circuit board 38. The circuit board 38 again accommodates electronic components 40, which preferably are operating and display elements, for example pushbuttons, switches and light-emitting diodes. However, other components that handle control or regulatory functions can also be situated there. The circuit board 38 is connected with the circuit board 16 of the first functional module by way of a plug-in coupling 42. The circuit board 38 extends parallel to the circuit board 22 and normal to the circuit board 16. In this way, operating and display elements come to lie on the axial side of the electronics housing 14. The third functional module formed by the circuit board 38 provides an optional functionality, for example possible settings for timing or the like. The output signals are transmitted via the plug-in coupling 42 to the first circuit board 16, and from there, possibly via the plug-in coupling 30, to the circuit board 22 and the engine electronics situated there. In particular, the electronic components 40 on the circuit board 38 can activate and deactivate the drive motor by turning on and off the power supply provided by the first functional module, i.e., the circuit board 16 and the electronic components 17 arranged thereon.

Let it be understood that one and the same pumping set can be offered with or without the third functional module. The circuit boards 16 and 22 with the electronic components 17 and 28 situated thereon then remain unchanged. In other words, a modular design is here created that makes it possible to put together various functional modules depending on the desired functionality of the pump. The first functional module comprised of the circuit board 16 and electronic components 17, which in particular exhibits or comprises a switching power supply or a transformer, could also be offered in various configurations. For example, it is conceivable that, if a system intended to incorporate the pumping set already had an extra-low voltage supply anyway, a power supply unit could be omitted in the first functional module, so that the circuit board 16 in this instance would not have to exhibit a transformer and switching power supply. In this way, the pumping set with one and the same stator casing 2 and electronic components integrated therein, i.e., the circuit board 22 and electronic components 28, could be provided for different voltage supplies, specifically a supply voltage or extra-low voltage. Only a different circuit board 16 would then have to be arranged in the electronics housing 14.

In this embodiment, the stator casing 2 is additionally sealed by a cover 44 at its axial end facing the electronics housing 14. The cover 44 has an opening 46 through which the plug-in coupling 30 extends. The cover 44 forms a wall, which separates the interior of the stator casing 2 and the interior of the electronics housing 14 from each other.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A pumping set comprising an electric drive motor and an electronic controller, wherein the controller is divided into two functional modules (16, 22) arranged on at least two separate circuit boards, of which a first functional module (16) includes a power supply unit arranged on a first one of the at least two separate circuit boards, the power supply unit providing an input voltage for the second functional module (22), and wherein the second functional module (22) includes engine electronics arranged on a second one of the at least two separate circuit boards, the engine electronics being connected to stator coils (24) of the drive motor to supply the drive motor with current.

2. The pumping set according to claim 1, wherein the power supply unit of the first functional module (16) provides an extra-low voltage as the input voltage for the second functional module (22).

3. The pumping set according to claim 1, wherein the engine electronics are designed to supply the stator coils (24) with extra-low voltage.

4. The pumping set according to claim 1, wherein the first (16) and second (22) functional modules are connected to each other by an electrical plug-in connector (30, 32).

5. The pumping set according to claim 1, wherein the first functional module (16) includes a transformer or switching power supply.

6. The pumping set according to claim 1, wherein the first functional module (16) includes at least one setting element (34), configured to set a speed of the drive motor, and/or a sensor element, which are signal-connected with the second functional module (22).

7. The pumping set according to claim 1, wherein the engine electronics of the second functional module (22) are configured to control the speed of the drive motor, and include an electronic circuit breaker configured to generate an output voltage of the desired frequency.

8. The pumping set according to claim 1, wherein the second functional module (22) is arranged in a stator casing (2) of the drive motor, and the first functional module (16) is arranged in an electronics housing (14) connected with the stator casing (2).

9. The pumping set according to claim 8, wherein an interior of the stator casing (2) and an interior of the electronics housing (14) are separated from each other by at least one wall.

10. The pumping set according to claim 8, wherein the electronics housing (14) is secured to an axial face of the stator casing (2).

11. The pumping set according to claim 8, wherein the second functional module (22) forms a modular unit with a stator (4) of the drive motor.

12. The pumping set according to claim 8, wherein the circuit boards of the first functional module (16) and second functional module (22) are arranged at an angle relative to each other.

13. The pumping set according to claim 12, wherein the angle is about 90 degrees.

14. The pumping set according to claim 8, wherein the controller includes a third functional module (38), which includes operating and/or display elements (40).

15. The pumping set according to claim 14, wherein the third functional module (38) is electrically connected with the first functional module (16).

16. The pumping set according to claim 14, wherein the third functional module (38) is linked with the first functional module (16), and the first functional module (16)

establishes a signal connection between the third (38) and second (22) functional module.

17. The pumping set according to claim 14, wherein the pumping set is a recirculation pumping set.

18. The pumping set according to claim 17, wherein the pumping set is a heating or industrial water recirculation pumping set.

19. The pumping set according to claim 14, wherein the drive motor is a canned motor or spherical motor.

\* \* \* \* \*